(12) United States Patent
Jain et al.

(10) Patent No.: US 8,627,123 B2
(45) Date of Patent: Jan. 7, 2014

(54) MANAGING POWER PROVISIONING IN DISTRIBUTED COMPUTING

(75) Inventors: Navendu Jain, Bellevue, WA (US); Aman Kansal, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 12/731,205

(22) Filed: Mar. 25, 2010

(65) Prior Publication Data

US 2011/0239010 A1   Sep. 29, 2011

(51) Int. Cl.
*G06F 1/26* (2006.01)

(52) U.S. Cl.
USPC .......................................... 713/310; 718/104

(58) Field of Classification Search
USPC .................... 713/320, 310; 718/104
See application file for complete search history.

(56) References Cited

U.S. PATENT DOCUMENTS

| | | | |
|---|---|---|---|
| 7,203,944 B1 | 4/2007 | van Rietschote et al. | |
| 7,856,041 B2 * | 12/2010 | Johnson | 372/45.011 |
| 8,104,041 B2 * | 1/2012 | Belady et al. | 718/105 |
| 2003/0110012 A1 | 6/2003 | Orenstien et al. | |
| 2004/0107273 A1 | 6/2004 | Biran et al. | |
| 2008/0163239 A1 | 7/2008 | Sugumar et al. | |
| 2008/0301473 A1 | 12/2008 | Perez et al. | |
| 2009/0132842 A1 * | 5/2009 | Brey et al. | 713/322 |
| 2009/0204826 A1 * | 8/2009 | Cox et al. | 713/320 |
| 2009/0210726 A1 | 8/2009 | Song et al. | |
| 2009/0210767 A1 | 8/2009 | Myung et al. | |
| 2009/0282274 A1 | 11/2009 | Langgood et al. | |

FOREIGN PATENT DOCUMENTS

GB   2404054   1/2005

OTHER PUBLICATIONS

International Search Report, Oct. 26, 2011, PCT/US2011/029108.
Supplementary European Search Report, EP 11 75 9960; Feb. 20, 2013, Munich.

* cited by examiner

*Primary Examiner* — Albert Wang

(57) ABSTRACT

One or more computers manage power consumption in a plurality of computers by repeatedly evaluating power consumption of pluralities of computers such that any given plurality of computers is evaluated by aggregating indicia of power consumption of the individual computers in the given plurality. The evaluation identifies or predicts pluralities of computers that are over-consuming power and identifies pluralities of computers that are under-consuming power. A first plurality of computers identified as over-consuming power are sent messages to instruct some of its comprising computers or virtual machines (VMs) to lower their computational workload. A second plurality of computers identified as under-consuming power are sent messages instructing the other computers to increase their computation workload.

19 Claims, 5 Drawing Sheets

MANAGING POWER PROVISIONING IN DISTRIBUTED COMPUTING

BACKGROUND

Provisioning power to a large number of distributed compute elements in large-scale computing infrastructures such as data centers, grids, clouds, containers, etc. is often a challenging problem. Typically, a fixed power budget or amount is distributed using a static wiring and power backup infrastructure to multiple power consuming elements including computer servers, storage appliances, and network devices, etc. (together referred to be referred to as compute elements). The power consumption of these elements is not static and often changes with dynamic workloads or data access patterns of the user applications executed on these elements. A problem that arises due to these changes is that the static power distribution infrastructure may not readily be able to re-distribute power to the elements that need it even when excess capacity exists for other elements. Currently, to keep the system working during such changes, a significant amount of excess power capacity is supplied to each different part of the system so that dynamic demand variations in each part can be accommodated. Consequently, power may be under-utilized in one part of the power supply system while at the same time power may be insufficient in another part of the power supply system.

Techniques related to dynamic power management are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

To summarize, power consumption of various compute elements may be monitored, in an online manner, or combined with an offline manner, and power usage may be compared to the power availability or specified budgets across a power distribution infrastructure. For instance the power distribution infrastructure may have fixed power budgets across data center colos (rooms), racks, circuits, containers, or individual servers or clusters. When the power budget at one or more of the budgeted boundaries is exceeded (or is close to being exceeded or predicted to being exceeded), power budget enforcement may be initiated to actively (or proactively) reduce the power usage in the overloaded portion (or predicted to be overloaded portion, respectively) of the infrastructure. Based on power management policies specified by users and/or operators, the power usage is controlled by using one or more enforcement mechanisms. Such mechanisms may include the following or others. Some or all of the workload causing increased power usage may be migrated to those portions (e.g., different colos) of the power infrastructure where power budget is not being exceeded. For stateless services, application instances or virtual machines (VM) hosting application instances may be terminated at overloaded sites and new instances or VMs hosting them instantiated at a later time on the same server or on a different server; such techniques are applicable even in cases where application state can be recreated (e.g., using information stored in a user client in an instant messaging service). Application components themselves or virtual machines hosting application components may be migrated or temporarily suspended from execution (e.g., paged to storage) and resumed at a later time on the same server or on a different server, servers in overloaded parts may be shut down or transitioned to low power performance states or low power sleep states and similar ones started in other parts of the infrastructure. User workload coming into a datacenter can be re-directed to servers in non-overloaded parts in the same datacenter or other datacenters. Power usage of certain servers (for instance those executing low priority or low revenue applications) may be lowered by reducing the CPU processor frequency (and/or memory/cache allocation and memory bandwidth, among other resources) on those servers. The CPU time allocated to certain applications may be reduced, thus allowing the processor to spend more time in low power performance states or low power sleep states and hence reduce the average power draw. Automated power alerts may be sent to users, operators, and software applications that may respond by changing their processing type (for example a movie streaming server may switch from HD resolution to standard definition) and the reduced workload reduces the power drawn. Incoming user requests may be re-directed and workloads may be migrated across geo-distributed data centers based on available power capacity, dynamic power pricing/availability, availability and capacity of hosting compute elements, migration costs such as the bandwidth and latency incurred in migration, among other factors. Other power control options provided by the software and hardware deployed may also be invoked.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Power Distribution Overview

Figure 1:
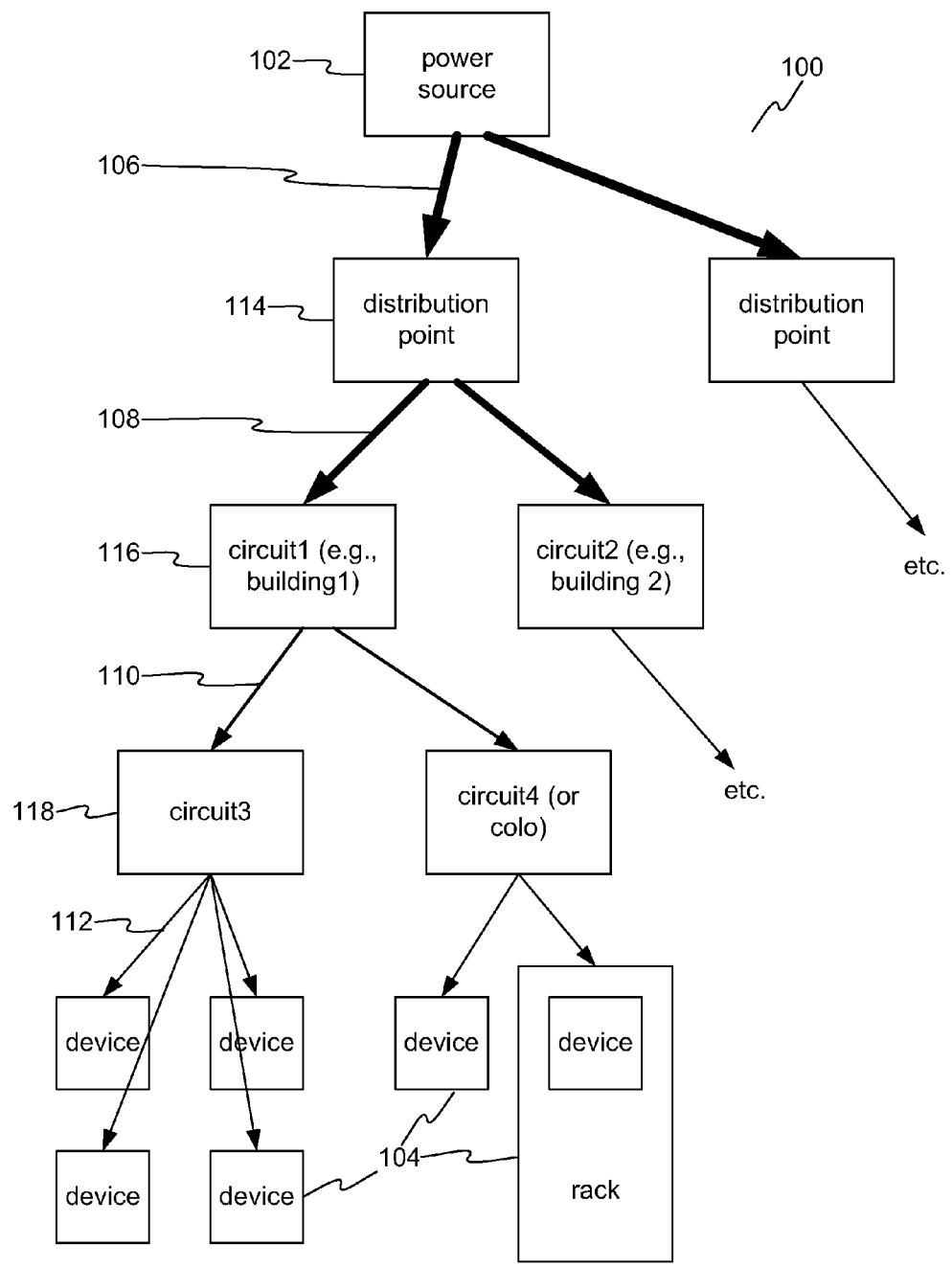
FIG. 1 shows a power distribution system for a computing infrastructure.

FIG. 1 shows a power distribution system 100 for a computing infrastructure. Most data centers, server farms, etc., have a somewhat fixed power supply system. That is, power is provided in fixed portions that decrease with distance from a power supplier or power source 102 to compute devices 104 that ultimately consume the power. While the power supplier or power source is known to change the amount of power distributed to various circuits, at any given time the supply may, for discussion, be assumed to be fixed or the ability to change the distribution dynamically may be limited or inconvenient. For example, ignoring power loss in wires, transformers, switches, etc., power may be provided, from source 102, in decreasing fixed quantities 106, 108, 110, 112, to distribution point 114 (e.g., neighborhood, campus, power substation, etc.), to circuit1 116, to circuit3 118, to various devices 104. The compute elements or devices 104 may be computing elements such as servers, switches, routers, data storage devices (e.g., tape banks), containers, racks for computer blades or the like, and so on.

A data center, computing cloud, or other type of coordinated computation infrastructure may rely on a power distribution system 100 like the one shown in FIG. 1. Clusters of servers, for example, may be used to provide generic service/application hosting to customers. In many cases, the variety of types of hosted applications running at any given time, as well as the workload for the same, can fluctuate in ways that may be difficult to predict or know in advance. Error conditions, network or server failures, increased external demand for hosted applications/services, and many other factors may unpredictably and rapidly increase the computation load, and therefore power consumption, for individual servers, clusters of servers, supercomputers, and even entire data centers, which may be physically distant and yet may be integrated via a network to provide a coherent and uniform hosting service. Similarly, low computation workload may create excess unconsumed power in another part of the power supply infrastructure.

Figure 2:
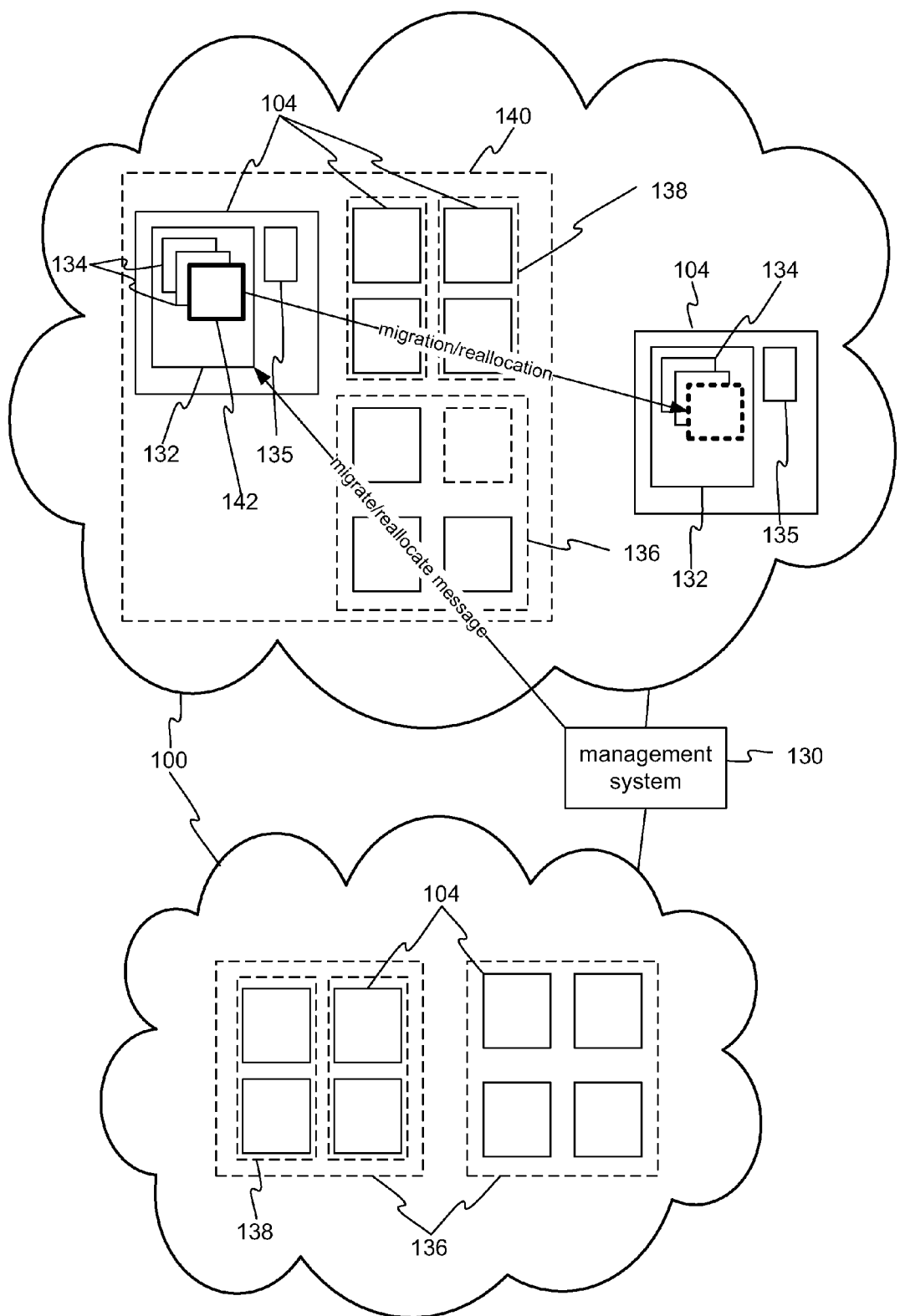
FIG. 2 shows computing infrastructure.

FIG. 2 shows computing infrastructure. The example infrastructure has two data centers 100. For discussion, a data center 100 may be considered any arbitrary unit for housing compute elements or devices 104 and possibly providing them with power, cooling, human operator access, etc. A distributed management system 130 has the ability to obtain measurements of resource usage of applications at hosts, different runtime properties and characteristics of cloud hosting platform, and/or aggregate measurements for arbitrary groups of hosts, for example, memory use, CPU utilization, active processes/threads, network connections, network bandwidth use, power consumption, disk drive activity, memory faults, cache hit ratios, etc. For additional description of one of a variety of techniques that may be used, see U.S. patent application Ser. No. 12/774,203, titled Managing Runtime Execution of Applications on Cloud Computing Systems, filed on May 5, 2010, which is incorporated herein by the reference thereto.

Power Monitoring and Management

A data center 100 may include various computing devices 104. Computing devices 104 may include application hosting software 132, which allows a device to be provisioned with various applications 134 which typically will access and provide data via a network, including to external users thereof. Computing devices 104 may also host databases, provide DNS or web services, provide load balancers, or other specialized infrastructure-type software. Computing devices 104 may also have a monitoring component 135 that provides the management system 130 with performance, resource usage, availability, power consumption, and network statistics, among other metrics and properties. The monitoring components 135 of the computing devices 104 may cooperate to form a peer-to-peer network to compute aggregate view of global state or allow data to be collected to a central server or plurality of logically-centralized servers for automated analysis and decision making (discussed later), aggregation, sharing, correlation inference, etc. The monitoring components 135 are shown as residing within the hosting software 132, as the hosting software 132 may be convenient for managing the monitoring components 135. However, the monitoring components need not be managed by the hosting software 132. The monitoring components 135 may be separate and apart from the hosting software 132 or on some computing devices 104, monitoring components 135 may be handled by the hosting software 132 and on others they may be autonomous.

A data center 100 may also have units of management and organization, e.g., clusters 136, sub-clusters 138, buildings 140, containers, colos, and others. Various units of organization may correspond to various of the fixed power quantities 106, 108, 110, 112. The management system 130 obtains information about power usage for various levels of organization, such as individual devices, and/or clusters, and/or sub-clusters, and/or circuits, etc. The management system 130 may obtain usage levels of devices 104 and derive usage levels of organizational units such as racks, clusters, containers, colos, etc., as well as performance, service-level agreements (SLAs), and priorities, etc. of hosted applications and VMs (virtual machines). The management system 130 may in turn determine which organizational units have excess and/or insufficient power. The management system 130 may then instruct (e.g., via network messages or directly via console terminals) various devices 104 to take actions that will reduce and/or increase power consumption. For instance, the management system 130 may transmit a message to a device 104 to migrate, terminate, throttle down, etc. application 142. In the case of migration, the application 142 may be moved (or activated, throttled up) etc. on another device 104 on a power unit that has excess power available. The same process may be performed for numerous other applications, virtual machines (VMs), etc. The net effect will be that the power consumption on the problem power unit will decrease and power consumption on the other power unit will increase, but the power usage of both units will be within their specified power budgets. The same process may be performed for multiple power units to ensure that their runtime power usage does not exceed their specified power budgets.

In one embodiment, computing load (and therefore power consumption) on servers or devices 104 may be regulated by the management system 130 by the use of virtual machines. The management system may migrate entire virtual machines, reduce/increase the computing resources available to virtual machines (e.g., increase/decrease virtual CPU speed, virtual memory, cache allocation, memory bandwidth allocation, etc.), say, based on their priority, revenue-class, utilization, temporarily suspend their execution and resume at a later time on the same server or on a different server, or otherwise manipulate or reconfigure virtual machines to adjust computing load to fit the current power allocations across a data center 100, cloud infrastructure, etc. In another embodiment, the management system 130 may cause cloud computing infrastructure to route user requests to different servers hosted in the same data center or different data centers according to the current power usage.

To elaborate, the management system 130 may have power caps or limits for various power consumption units (e.g., colos, containers, racks, individual servers), where power caps are enforced in a virtualized cloud environment. This may enable power over-subscription where the aggregate peak power consumption of hosted applications or VMs exceeds a specified power budget, which may reduce power provisioning costs. Some commercially available servers or devices 104 provide power metering and capping functionality in hardware and methods to enforce a power budget using Dynamic Voltage Frequency Scaling (DVFS) are available. However, when multiple distributed or virtualized applications share a physical server, enforcing a power cap on the server as a whole affects the performance of all running VMs on that server. This may affect performance of multiple applications due to excessive load in only one of the applications. Moreover, these power related aspects may be embodied in a power policy. Note that a power policy may specify or characterize desirable features of application behavior such as characteristics of power consumption on different server components (or groupings) at different times of day or during different user demands and workloads. For an example of a power related policy, see FIG. 4 of the above-mentioned related patent application. See also the related discussion of policies.

By allowing a power policy to be specified for individual applications or VMs, it may be possible to regulate power consumption on a per-application or a per-VM basis. When a physical server exceeds its power cap, an Energy Enforcement Module (an embodiment of or component of management system 130) running on any server or device 104) can enforce the cap by selectively throttling resource allocations to individual applications or VMs, temporarily suspending a subset of running VMs from execution and resuming them at a later time either on the same server or on a different server, terminating the VM and instantiating a new VM hosting a new application instance (in case of stateless services and also for stateful services that support recreation of application state) at a later time on the same server or on a different server, among other actions, according to a user specified policy. For instance, a user policy may require VMs for low priority applications to be capped first and if such action is insufficient to meet the power cap, higher priority VMs may then be throttled.

An EEM may be used to implement priority aware energy accounting and enforcement in shared cloud infrastructures. Suppose a cloud server hosts VMs from high priority interactive applications whose workload changes dynamically, as well as low priority VMs performing background tasks such as web crawling, data replication, scientific workloads, and DryadLINQ/Map-Reduce jobs. VMs from all applications may be distributed across the cloud servers based on VM placement constraints. The EEM monitors power caps on all servers used. When the EEM detects that the power cap is being exceeded or predicts that the power cap is likely to be exceeded in the near future, it enforces the cap according to a specified enforcement policy. Consider the following illustrative policy for power cap enforcement in an EEM: "reduce the CPU allocations for low priority background VMs, and only if that does not suffice to bring the power consumption within specified power budget, throttle resources to high priority VMs." According to the policy, when a circuit breaker supplying power to a rack of servers is close to capacity, the EEM will first select low priority VMs on servers within the rack to reduce power usage, instead of throttling the whole server which could imply throttling high priority VMs running on them.

Power Policy Enforcement

Figure 3:
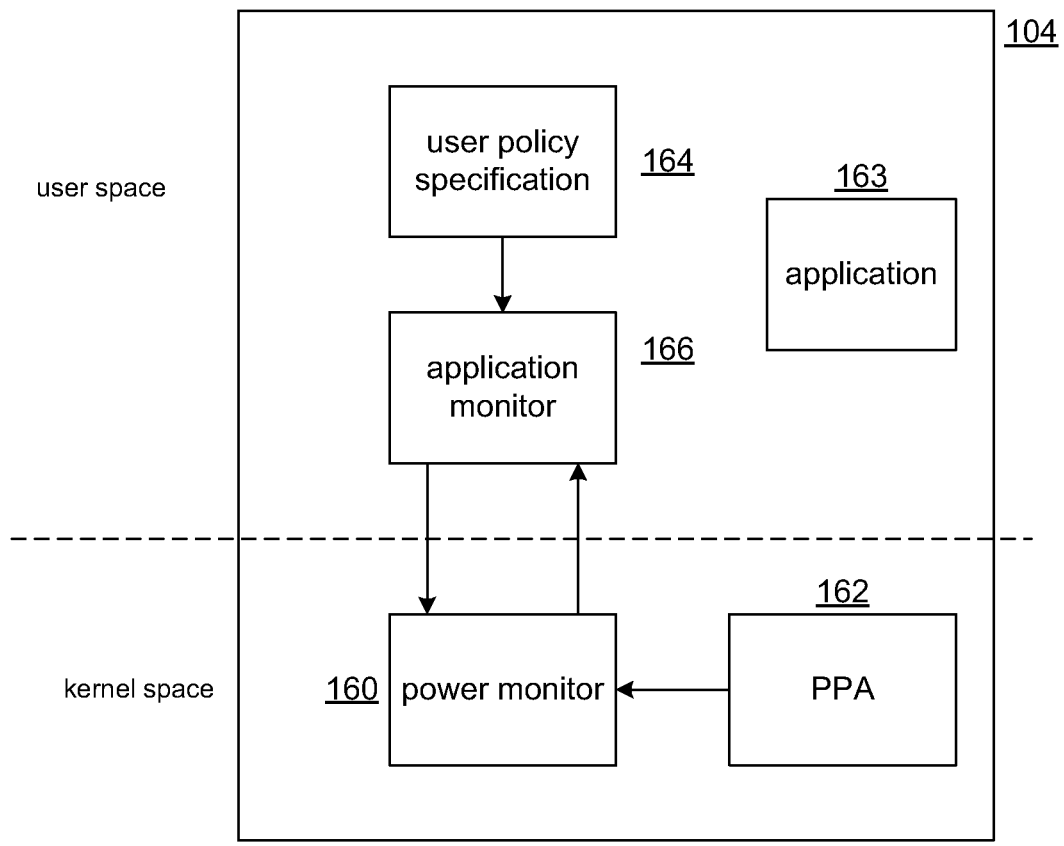
FIG. 3 shows two modules for implementing Energy Enforcement Module (EEM) functionality.

FIG. 3 shows two modules for implementing Energy Enforcement Module (EEM) functionality. A power monitor 160 module monitors power use, and a priority-based power allocator (PPA) 162 module enforces power policy. FIG. 3 also shows an application 163, a user policy specification 164, and application monitor 166, each of which is described in the related patent application mentioned above. Regarding the power monitor 160, if a hardware-based power measurement facility is available on the server or device 104, such facility may be used for the power monitor 160. Some servers have such built-in power metering hardware, but if such is not available, other techniques may be used. For example, a WattsUp PRO ES power meter may be used to measure server power. In such a case, a serialized protocol driver for the power meter may be interfaced to the application monitor 166 to access the power data. The application monitor 166 may forward the power data to other monitors or a management module for aggregation, correlation, and analysis, etc.

Regarding the PPA 162, a power cap may be enforced, among other ways, by changing the CPU time or portion allocated to the VMs on the server. In one embodiment, processor time throttling may itself be sufficient because processors typically contribute the majority of total power consumption of small form-factor servers. In addition or in the alternative, per-process, per-application, or per-VM throttling may be performed, for example. As the CPU time allocated is reduced, the server's processor spends more time in low power/performance states thereby reducing the power usage. In one embodiment, Windows Hyper-V may be used for virtualization. Similar functionalities such as Xen VMM are available in other systems. For additional details on how to modify Hyper-V to change CPU time allocation, see R. Nathuji, P. England, P. Sharma, and A. Singh., "Feedback driven dos-aware power budgeting for virtualized servers", in the Fourth International Workshop on Feedback Control Implementation and Design in Computing Systems and Networks (FeBID), April 2009.

While processor time throttling for an individual server hosting multiple VMs may address a power cap for that server, power may also be managed across multiple servers. In a data center, multiple servers may be running the same cloud service e.g., multi-tier web and e-commerce applications with an HTTP front-end, an application middle-tier, and a database back-end. Thus, throttling one server may cause it to become a bottleneck for the cloud service, thereby degrading the performance of the whole service. Moreover, servers may share common power supplies and may have a limit on the total power consumption at the enclosure level (e.g., rack, container) based on the capacity of their power supplies. Therefore, power management may need to be performed at the enclosure level in a data center. To enable this functionality, a simple global power control policy may be implemented.

EXAMPLE OF POWER MANAGEMENT

Figure 4:
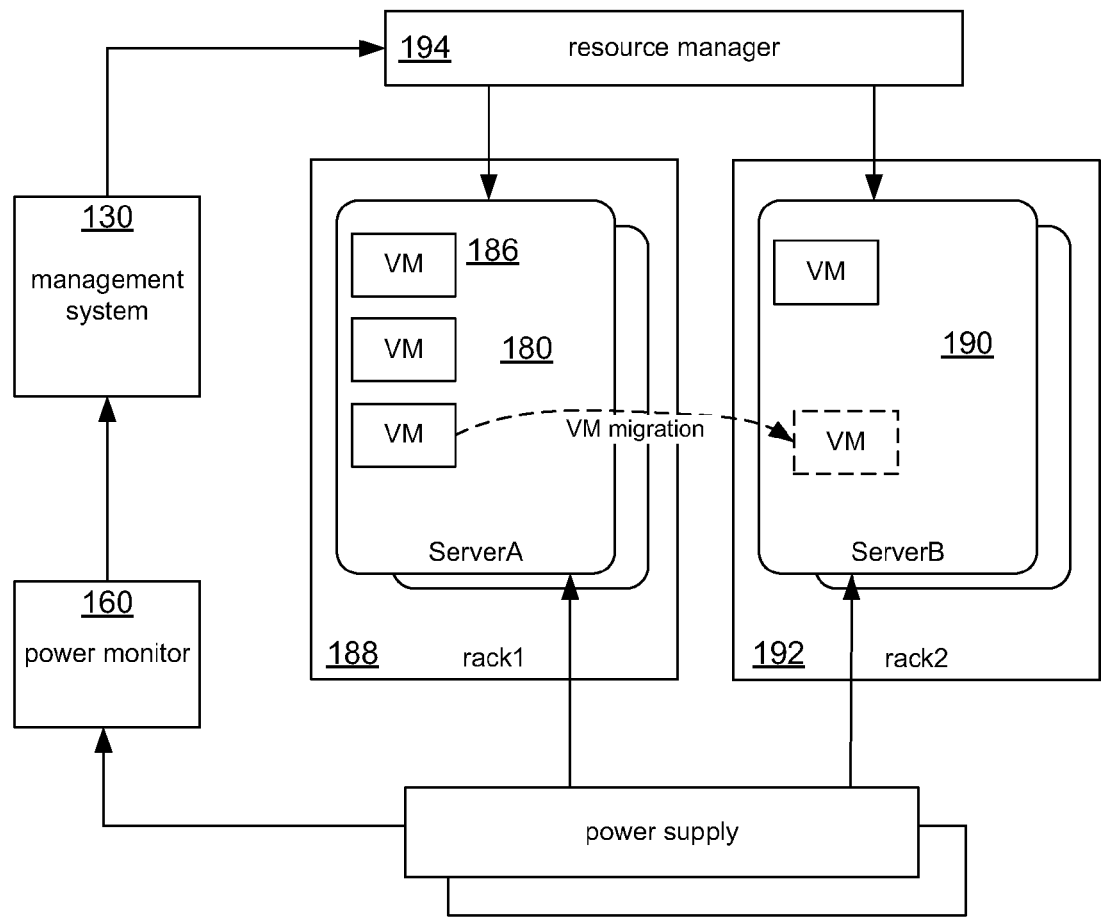
FIG. 4 shows an implementation for managing power consumption across racks.

FIG. 4 shows an implementation for managing power consumption across racks. It should be noted that any unit of power management other than a rack may be used, for example, a building, a circuit, a container, a colo, an uninterruptable power supply, etc. As shown in FIG. 4, the power monitor 160 (e.g., a power meter) measures the total power consumption of all servers 180 across a rack 188 and sends these values to the management system 130, which may be a network of cooperating agents, application monitor programs, or a program running on a designated management server, among other configurations. The management system 130 also collects the power usage of individual VMs 186 running on each server 180; the per-VM power usage may be calculated using power monitor 160, for example Joulemeter (see A. Kansai, F. Zhao, J. Liu, N. Kothari, and A. Bhattacharya, "Virtual machine power metering and provisioning", ACM Symposium on Cloud Computing, 2010) running in the root hypervisor on each server 180. When the management system 130 detects that the power consumption of a rack, for instance rack1 188 is above a predetermined power budget, it selects the requisite number of VMs 186 (to meet the power budget) with the highest power utilization on that rack 188 for migration to under-utilized servers 190 on other racks—such as rack2 192—operating below their power budget, and sends a message indicating this decision to the resource manager 194 for actuation. If under-utilized servers are unavailable to host migrated VMs or migration costs are more expensive than their benefits, then the VMs may be temporarily suspended from execution and resumed at a later time, for example. This example power policy, though simple, may reduce performance of VMs during their migration.

To minimize the impact on performance, an alternative policy would be to first migrate (or assign highest priority to) VMs 186 processing background tasks (e.g., computing index for web search, map-reduce jobs, scientific workloads, DryadLINQ/Map-Reduce jobs, etc.) from racks having power capacity overload to under-utilized servers hosted on racks below their power budget, and if that still doesn't suffice to meet the power cap on power overloaded racks, then the policy may be to migrate VMs processing foreground tasks and to assign interactive VMs the lowest processing priority for migration. Further, hybrid schemes based on combining power utilization, priority, revenue-class, and user interactiveness (e.g., SLA penalty on performance), among other factors, can be used to prioritize VMs for migration to meet power budgets across racks. Two examples of such policies are as follows. The first hybrid example policy assigning priorities to VMs for migration would be to assign higher priority to VMs with higher power consumption and if two VMs have the same power usage, prioritize the VM with a lower SLA penalty on performance impact. The second hybrid example policy would be to assign higher priority to VMs with the least SLA penalty on performance degradation and if the SLA penalty on performance is the same for two VMs, select the VM with the higher power consumption. As above, if under-utilized servers are unavailable to host migrated VMs or migration costs are more expensive than their benefits, then the VMs may be temporarily suspended from execution and resumed at a later time either on the same server or on a different server, among other policies.

Figure 5:
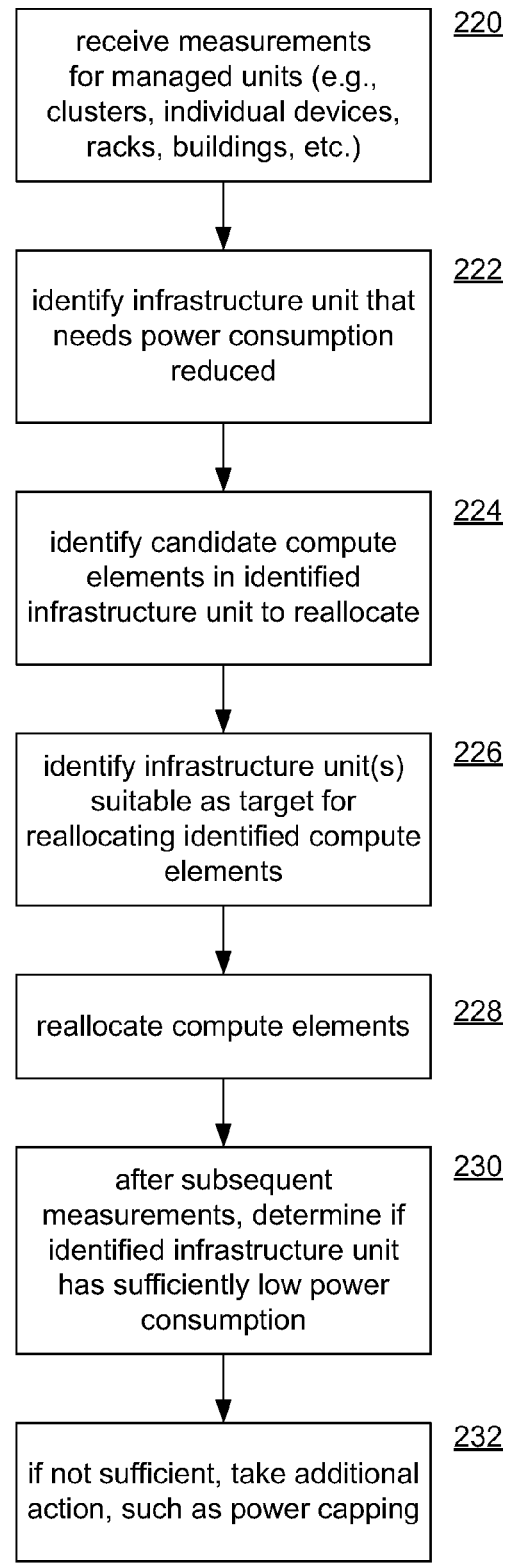
FIG. 5 shows an example power management process performed by the management system.

FIG. 5 shows an example power management process performed by management system 130. Power measurements are repeatedly received 220. The measurements are repeatedly used to identify 222 power infrastructure that needs to reduce its power consumption. Then candidate compute elements (e.g., applications, VMs, CPUs, servers) corresponding to the identified 222 power infrastructure are then identified 224 as potential candidates for migration or for the execution of other power-reducing actions. The compute elements may be identified 224 based on a user and/or operator authored power usage and enforcement policy. In embodiments where throttling back the identified 224 compute elements might require a compensatory increase in computation elsewhere, the process may include identifying 226 infrastructure suitable as targets to reallocate 228 identified 224 compute elements. For instance, the power management policy might provide conditions or characteristics of compute elements that are to be given priority for having their compute load increased e.g., compute elements with under-utilized power capacity. After further power measurements are received, the process may optionally determine 230 if the identified infrastructure has had its power consumption sufficiently lowered. If no additional actions may be taken 232. Other processes may be used to accomplish power balancing. In one embodiment, power allocation and SLA performance may be combined, and if application performance is not meeting the SLA, more power may be allocated or power may be prevented from be reduced.

CONCLUSION

To summarize, power consumption of various compute elements may be monitored and power usage may be compared to the power availability or specified budgets across a power distribution infrastructure. For instance the power distribution infrastructure may have fixed power budgets across data center colos (rooms), racks, circuits, containers, or individual servers or clusters. When the power budget at one or more of the budgeted boundaries is exceeded (or is close to being exceeded or is predicted to be exceeded), power budget enforcement may be initiated to actively reduce the power usage in the overloaded portion of the infrastructure. Based on power management policies specified by users and/or operators, the power usage is controlled by using one or more enforcement mechanisms. Such mechanisms may include the following or others. Some or all of the workload and applications or VMs processing these workloads, causing increased power usage may be migrated to those portions of the power infrastructure where power budget is not being exceeded. Virtual machines may be migrated, application instances or servers in overloaded parts may be shut down and similar ones started in other parts of the infrastructure. User coming requests coming into a datacenter as well as running workloads can be re-directed or migrated to servers in non-overloaded parts in the same datacenter or in other datacenters. Power usage of certain servers (for instance those executing low priority or low revenue applications) may be lowered by reducing the CPU processor frequency (or memory/cache/memory bandwidth allocation among other resources, per-application or per-VM) on those servers. The CPU time allocated to certain applications may be reduced, thus allowing the processor to spend more time in low power performance states or low power sleep states and hence reduce the average power draw. Automated power alerts may be sent to users, operators, and software applications that may respond by changing their processing type (for example a movie streaming server may switch from HD resolution to standard definition) and the reduced workload reduces the power drawn. Workloads may be migrated across geo-distributed data centers based on available power capacity, dynamic power pricing/availability, availability and capacity of hosting compute elements, migration costs such as the bandwidth and latency incurred in migration, among other factors. Other power control options provided by the software and hardware deployed may also be invoked.

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing rapidly accessible digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computer, the method comprising:

receiving power measurements or estimates from pluralities of server computers, the power measurements or estimates comprising measurements or estimates of power consumption of the server computers, the pluralities of server computers receiving power from respective power infrastructure units external to the server computers, the power infrastructure units having respective target power use loads;

evaluating the power measurements or estimates to determine when power infrastructure units, according to the respective target power loads, require a reduction or increase in power use; and in response to a determinations of a requirements for power reduction or increase for the power infrastructure units, sending messages to corresponding server computers receiving power from the power infrastructure units, the messages causing reductions or increases in computation load on the one or more server computers by initiating virtual machine (VM) operations comprising migration, starting, and/or stopping of virtual machines (VMs) executing on the one or more server computers, the migrating, starting, and/or stopping resulting in power uses of the power infrastructure units being adjusted toward the target power loads of the respective power infrastructure units.

2. A method according to claim 1, wherein a power infrastructure unit needing power reduction or increase is determined by computing and predicting a total power from received power measurements or estimates for a corresponding plurality of server computers that receive their power from the power infrastructure unit, and based on the total power, determining that compute load is to be reduced for the plurality of server computers.

3. A method according to claim 2, wherein the determinings are performed using a power consumption policy, where the policy specifies the target power loads.

4. A method according to claim 1, wherein reductions or increases in computation and/or power of the pluralities of server computers are further effected by causing one or more CPUs on the one or more server computers to consume less power by changing a setting of the CPU that affects its power consumption.

5. A method according to claim 1, in further response to determining that a power infrastructure unit requires a decrease or increase in power use, increasing or decreasing computation load on one or more server computers not receiving power from the power infrastructure unit.

6. A method according to claim 5, wherein the increasing or decreasing in computation is effected by starting execution of one or more VMs executing on the one or more server computers not receiving power from the power infrastructure unit.

7. A method according to claim 5, wherein the increase or decrease in computation load of the one or more server computers not receiving power from the overloaded power infrastructure unit results in increased or decreased power consumption by one or more CPUs thereon.

8. One or more computer-readable storage media storing information to enable a controller device to perform a process, wherein the computer-readable storage media is not a signal, the process comprising:

receiving a policy defining power consumption targets for respective sets of computing devices or power infrastructure units;

repeatedly obtaining measurements or estimates of total power consumption for the respective sets of computing devices;

determining from the total power consumptions and from the power consumption targets that a first set of computing devices is over-consuming or under-consuming power relative to a corresponding first power consumption target, and identifying from the total power consumptions a second set of computing devices; and in response to the determining that the first set of computing devices is over-consuming or under-consuming power, causing an increase or decrease in power consumption by the first set of the computing devices by transmitting messages instructing computing devices in the first set to raise or lower their computational load, and causing an increase or decrease in power consumption by the second set of computing devices by transmitting messages instructing computing devices in the second set to increase or decrease their computational load.

9. One or more computer-readable storage media according to claim 8, further comprising selecting the second set of computing devices according to information indicating that the second set of computing devices obtain power from a power infrastructure unit that does not supply power to the first set of computing devices.

10. One or more computer-readable storage media according to claim 9, wherein the increase in computational load and/or the decrease in computational load is effected by one or more of: migrating a virtual machine or changing a setting of a virtual machine (VM), the changing of a setting comprising either changing virtual CPU allocated to the VM, changing memory allocated to the VM, changing cache allocated to the VM, changing memory bandwidth allocated to the VM, among other resources, or temporarily suspending execution of the VM and resuming execution of the VM at a later time on a same or a different computing device.

11. One or more computer-readable storage media according to claim 9, wherein increase in computational load and/or the decrease in computational load is effected by one or more of: changing a CPU frequency setting, changing a cache allocation, changing a memory allocation, changing a memory bandwidth allocation, changing a processing priority of an application, or signaling an application to cause it to increase or decrease its compute load.

12. One or more computer-readable storage media according to claim 8, wherein the measurements or estimates are provided by power monitors included as part of the hardware of the computing devices and/or are provided by software modules running on some of the computing devices that estimate power consumption.

13. One or more computer-readable storage media according to claim 8, wherein the measurements or estimates of power consumption comprise measures of actual power consumed or power predicted to be consumed by the computing devices.

14. A method performed by one or more computers to manage power consumption in pluralities of computers, the method comprising:

repeatedly evaluating power consumption of the pluralities of computers such that any given plurality of computers is evaluated by aggregating indicia of power consumption of the individual computers in the given plurality, where the evaluating identifies pluralities of computers that are over-consuming power and identifies pluralities of computers that are under-consuming power; and responding to a first plurality of computers having been identified as over-consuming power by transmitting first messages to some computers in the first plurality of computers to instruct the some computers to lower their computational workload; and responding to a second plurality of computers having been identified as under-consuming power by transmitting second messages to some computers in the second plurality of computers to increase their computation workload.

15. A method according to claim 14, wherein the evaluating is based on a power consumption policy that defines rules for power consumption for the pluralities of computers.

16. A method according to claim 14, wherein the evaluating is based on estimates of power consumption provided by software applications running on the computers in the pluralities of computers.

17. A method according to claim 14, wherein after transmitting the first messages the evaluating indicates that the first plurality of computers is still over-consuming power, and in response enforcing further lowering of computation workload in the first plurality of computing devices.

18. A method according to claim 14, wherein power monitor programs running on the computers in the pluralities of computers provide measurements of individual power consumption of the computers, and the computation workload is lowered by either reducing CPU speed, halting or slowing application programs, altering the configuration of a virtual machine, reallocating resources, or migrating an application.

19. A method according to claim 14, wherein the pluralities of computers host an application managed by a cloud computing infrastructure, and the increasing and decreasing the computation load is performed by instructing the cloud infrastructure to reduce instances of the application or VMs running on the first plurality of computers and to increase instances of the application or VMs running on the second plurality of computers in the same data center or in a plurality of geo-graphically distributed data centers.

\* \* \* \* \*